(12) United States Patent
Kumar et al.

(10) Patent No.: US 10,103,410 B2
(45) Date of Patent: Oct. 16, 2018

(54) METHOD FOR JOINING CERAMIC TO METAL, AND SEALING STRUCTURE THEREOF

(71) Applicant: General Electric Company, Schenectady, NY (US)

(72) Inventors: Sundeep Kumar, Bangalore (IN); Mohamed Rahmane, Niskayuna, NY (US); Hongbo Cao, Niskayuna, NY (US); Darren Michael Stohr, Niskayuna, NY (US); Raghavendra Rao Adharapurapu, Bangalore (IN); Ravikumar Hanumantha, Bangalore (IN)

(73) Assignee: General Electric Company, Schenectady, NY (US)

( * ) Notice: Subject to any disclaimer, the term of this patent is extended or adjusted under 35 U.S.C. 154(b) by 472 days.

(21) Appl. No.: 14/719,742

(22) Filed: May 22, 2015

(65) Prior Publication Data
US 2015/0340742 A1 Nov. 26, 2015

(30) Foreign Application Priority Data
May 23, 2014 (IN) .......................... 2568/CHE/2014

(51) Int. Cl.
*H01M 2/08* (2006.01)
*H01M 10/02* (2006.01)
(Continued)

(52) U.S. Cl.
CPC ..... *H01M 10/3963* (2013.01); *B23K 35/3033* (2013.01); *B23K 35/3046* (2013.01);
(Continued)

(58) Field of Classification Search
CPC ....... B32B 15/017; B32B 15/01; B32B 18/00; B32B 2255/205; B32B 2311/22;
(Continued)

(56) References Cited

U.S. PATENT DOCUMENTS

| 4,016,447 A | 4/1977 | Patterson |
| 4,064,310 A | 12/1977 | Patterson |

(Continued)

FOREIGN PATENT DOCUMENTS

| CN | 101104567 A | 1/2008 |
| DE | 2527325 A1 | 12/1976 |

(Continued)

OTHER PUBLICATIONS

Schmidt et al., "Screen printing of co-precipitated NiMn2O4+δ for production of NTCR thermistors", Journal of the European Ceramic Society, ScienceDirect, Sep. 2003, pp. 1549-1558, vol. 23, Issue 10.

(Continued)

*Primary Examiner* — Rip A Lee
(74) *Attorney, Agent, or Firm* — Dority & Manning, PA (57) ABSTRACT

A method for joining a metal component to a ceramic component is presented. The method includes disposing a metallic barrier layer on a metallized portion of the ceramic component, and joining the metal component to the metallized portion of the ceramic component through the metallic barrier layer. The metallic barrier layer comprises nickel and a melting point depressant. The metallic barrier layer is disposed by a screen printing process, followed by sintering the layer at a temperature less than about 1000 degrees Celsius. A sealing structure including a joint between a ceramic component and a metal component is also presented.

15 Claims, 5 Drawing Sheets (51) Int. Cl.
*H01M 10/39* (2006.01)
*B23K 35/30* (2006.01)
*C04B 37/02* (2006.01)

(52) U.S. Cl.
CPC .............. *C04B 37/026* (2013.01); *H01M 2/08* (2013.01); *C04B 2235/656* (2013.01); *C04B 2235/6567* (2013.01); *C04B 2235/6582* (2013.01); *C04B 2237/122* (2013.01); *C04B 2237/123* (2013.01); *C04B 2237/126* (2013.01); *C04B 2237/127* (2013.01); *C04B 2237/128* (2013.01); *C04B 2237/343* (2013.01); *C04B 2237/405* (2013.01); *C04B 2237/55* (2013.01); *C04B 2237/597* (2013.01); *C04B 2237/708* (2013.01); *C04B 2237/72* (2013.01); *C04B 2237/765* (2013.01); *C04B 2237/80* (2013.01); *Y10T 156/10* (2015.01); *Y10T 428/12611* (2015.01)

(58) Field of Classification Search
CPC ........ B32B 2581/00; B32K 1/00; B32K 1/20; B32K 2201/36; B32K 2203/26; B32K 2203/52; H01M 2/08; H01M 10/3963
See application file for complete search history.

(56) References Cited

U.S. PATENT DOCUMENTS

| | | |
|---|---|---|
| 4,780,332 A | 10/1988 | Pitz et al. |
| 4,861,641 A | 8/1989 | Foster et al. |
| 5,009,357 A | 4/1991 | Baker et al. |
| 5,033,666 A | 7/1991 | Keusseyan et al. |
| 9,548,518 B2 * | 1/2017 | Kumar .................... B23K 1/19 |
| 2001/0036541 A1 | 11/2001 | Makino et al. |
| 2011/0244303 A1 | 10/2011 | Rahmane et al. |
| 2012/0063911 A1 | 3/2012 | Bossmann et al. |
| 2012/0164510 A1 | 6/2012 | Weaver et al. |
| 2013/0224561 A1 * | 8/2013 | Adharapurapu ... B23K 35/3033 429/149 |

FOREIGN PATENT DOCUMENTS

| | | |
|---|---|---|
| EP | 0333149 A2 | 9/1989 |
| JP | 1183477 A | 7/1989 |
| JP | 3295871 A | 12/1991 |
| JP | 08165174 A | 6/1996 |
| JP | 2009013490 A | 1/2009 |

OTHER PUBLICATIONS

Haag et al., "Pure nickel coating on a mesoporous alumina membrane: Preparation by electroless plating and characterization", Surface and Coatings Technology, ScienceDirect, Dec. 4, 2006, pp. 2166-2173, vol. 201, Issue 6.

Leon et al., "Preparation of nickel-coated powders as precursors to reinforce MMCs", Journal of Materials Science, Springer Link, Oct. 1, 2000, pp. 4763-4768, vol. 35, Issue 19.

European Search Report and Opinion issued in connection with corresponding EP Application No. 15168809.0 dated Oct. 2, 2015.

* cited by examiner

METHOD FOR JOINING CERAMIC TO METAL, AND SEALING STRUCTURE THEREOF

BACKGROUND

Embodiments of the invention relate generally to a method for joining a ceramic component to a metal component. More particularly, the invention includes embodiments that relate to a ceramic-to-metal joining for sealing a high temperature electrochemical cell. The invention also includes embodiments that relate to a sealing structure formed by using such a method.

Many types of seal joints have been considered for use in high-temperature rechargeable batteries/cells for joining different components. Sodium/sulfur or sodium/metal halide cells generally include several ceramic and metal components. The ceramic components include an electrically insulating alpha-alumina collar and an ion-conductive electrolyte beta-alumina tube, and are generally joined or bonded via a sealing glass. The metal components include a metallic casing, current collector components, and other metallic components which are often joined by welding or thermal compression bonding (TCB).

A metal-to-ceramic bonding is most critical for the reliability and safety of the cell because it has several issues, mainly due to thermal stress caused by a mismatch in the coefficient of thermal expansion for the ceramic and metal components. Many types of bonding materials and sealing processes have been considered for joining metal components to ceramic components, including ceramic adhesives, brazing, and diffusion bonding. However, most of the seals/joints may not withstand high temperatures and corrosive environments of the batteries/cells.

Current methods include metalizing the ceramic component, followed by bonding the metallized ceramic component to the metal component by thermal compression bonding. Usually, an outer surface of a metallization layer is further treated by plating the surface with a metal to form a metal layer on the metallization layer, before the metal component is bonded to the ceramic component. The plating layer provides a continuous metal layer on the metallization surface to obtain a high strength joint/bond with the metal component. Usually, although not necessarily, the plating metal is the same metal as that of the metal component, or a metal that is at least compatible with the metal of the metallization layer and with the metal component. For example, nickel has been conventionally used for plating a molybdenum-based metallization layer on alumina, specifically in high temperature batteries/cells.

Various methods have been used for plating metal (e.g., nickel) on the metallization layer, for example electroplating, electroless plating, screen printing, etc. Each of these processes has one or more issues with respect to the quality of the plating layer or the scalability of the process. Screen printing is a highly scalable, clean and cost effective process, but provides a porous metal layer. The porous plating layer may lead to the contamination of the metallization material which thus affects the strength of the resulting metal-to-ceramic bond/joint. This porous metal layer, for example, nickel layer, can be sintered (treated at high temperatures, e.g., above about 1200 degrees Celsius) for the densification of the layer, but may often form an intermetallic with the metal (e.g., molybdenum) of the metallization layer at high temperatures (usually above 1000 degrees Celsius). The formation of the intermetallic adversely affects the bonding between the plating layer and the metallization layer, and thus the joint/bond between the ceramic component and the metal component.

With these considerations in mind, it would therefore be desirable to develop new materials and methods for efficient ceramic-to-metal joining. Particularly, it may be desirable to have a method for sealing a high temperature electrochemical cell that differs from those methods that are currently available. It may be desirable to have a sealing structure that uses materials and methods that differ from those materials and methods that are currently available.

BRIEF DESCRIPTION

One embodiment provides a method for joining a metal component to a ceramic component. The method includes disposing a metallic barrier layer on a metallized portion of the ceramic component and joining the metal component to the metallized portion of the ceramic component through the metallic barrier layer. The metallic barrier layer comprises nickel and a melting point depressant.

In one embodiment, a method for sealing a high temperature electrochemical cell is provided. A metallization layer comprising molybdenum is first disposed on a portion of an alumina component. Then, a metallic layer is disposed on the metallization layer by a screen printing process, followed by sintering the metallic layer at a temperature less than about 1000 degrees Celsius to form a metallic barrier layer. The metallic layer comprises nickel and a melting point depressant. A nickel-containing metal component is then joined to the portion of the alumina component by brazing through the metallization layer and the metallic barrier layer.

In one embodiment, a sealing structure includes a metallized ceramic component, a metallic barrier layer disposed on the metallized ceramic component, and a metal component bonded to the metallized ceramic component through the metallic barrier layer. The metallic barrier layer includes nickel and a melting point depressant.

BRIEF DESCRIPTION OF THE DRAWINGS

These and other features, aspects, and advantages of the present invention will become better understood when the following detailed description is read with reference to the accompanying drawings, in which like characters represent like parts throughout the drawings, wherein.

DETAILED DESCRIPTION

The embodiments described herein relate to ceramic-to-metal joining. It should be understood that the embodiments are not limited to joining a ceramic component to a metal component for sealing an electrochemical cell/battery, for example sodium/sulfur or sodium metal halide cells, and the descriptions and figures are not limited to electrochemical cells. The embodiments described herein may have various applications, for example, in electronics, where ceramics are used as insulators in circuit boards, and need to be bonded to metals. Another application is in the lighting industry, for example in ceramic metal halide lamps where a metallic feedthrough needs to be bonded to a ceramic discharge chamber of the lamp.

Approximating language, as used herein throughout the specification and claims, may be applied to modify any quantitative representation that could permissibly vary, without resulting in a change in the basic function to which it is related. Accordingly, a value modified by a term or terms, such as "about," is not limited to the precise value specified. In some instances, the approximating language may correspond to the precision of an instrument for measuring the value.

In the following specification and the claims, the singular forms "a", "an" and "the" include plural referents unless the context clearly dictates otherwise. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may not be appropriate, capable, or suitable. For example, in some circumstances, an event or capacity may be expected, while in other circumstances the event or capacity may not occur.

The terms "comprising," "including," and "having" are intended to be inclusive, and mean that there may be additional elements other than the listed elements. As used herein, the term "and/or" includes any and all the combinations of one or more of the associated listed items. Unless otherwise indicated herein, the terms "disposed on", "deposited on" or "disposed between" refer to both direct contact between layers, objects, and the like, or indirect contact, e.g., having intervening layers therebetween.

Figure 1:
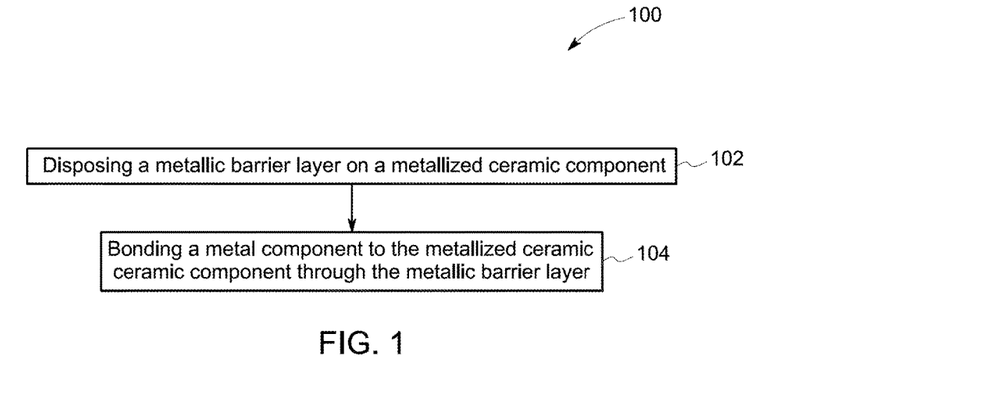
FIG. 1 is a flow diagram illustrating a method for joining a ceramic component to a metal component, in accordance with one embodiment of the invention.
Figure 2:
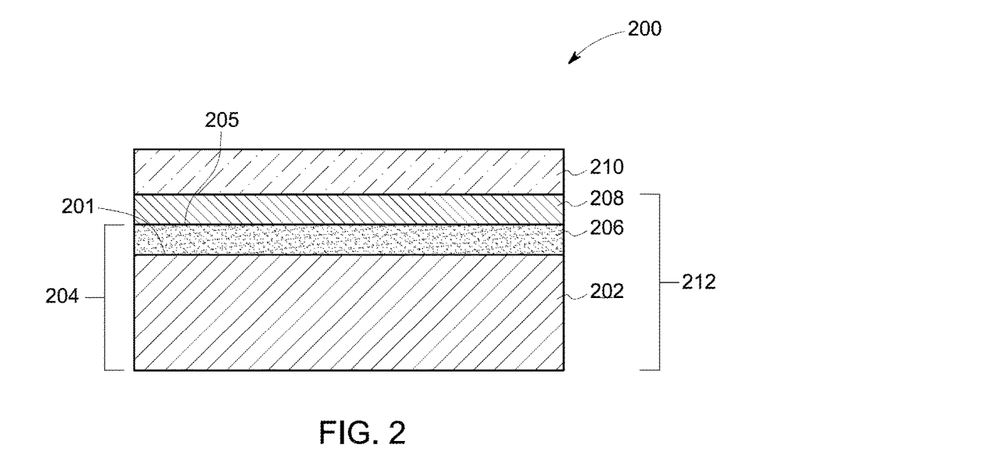
FIG. 2 is a schematic view of a sealing structure, in accordance with one embodiment of the invention.

According to one embodiment of the invention, a method for joining a ceramic component to a metal component is illustrated in FIG. 1. The method is highly scalable and cost effective, as compared to prior art methods, and provides a high-strength hermetic sealing structure 200 as depicted in FIG. 2. The method 100 involves a step 102 of disposing a metallic barrier layer 208 (FIG. 2) on a metallized portion of a ceramic component 204 (can also be referred to as "a metallized ceramic component" or "metallized ceramic"), and then a step 104 of bonding a metal component 210 to the metallized portion of the ceramic component 204 through the metallic barrier layer 208. The barrier layer 208 includes nickel and a melting point depressant.

As illustrated in FIG. 2, the metallized ceramic component 204 includes a metallization layer 206 disposed on a surface 201 of a ceramic component 202. In some embodiments, the metallization layer 206 is first disposed on a portion of the ceramic component 202 followed by the disposition of the barrier layer 208. As known to those skilled in the art, a metallized ceramic usually enables the bonding of the ceramic with a metal.

In one embodiment, the ceramic component 202 includes an electrically insulating ceramic. Suitable materials for the ceramic component 202 may include alpha-alumina, yttria, zirconia, yttria stabilized zirconia, yttrium aluminum garnet, magnesia alumina spinel, or yttrium aluminate perovskite. In one embodiment, the ceramic component 202 includes alpha-alumina.

Suitable metal examples for the metal component 210 include nickel, iron, copper or a combination thereof. In one embodiment, the metal component 210 includes nickel or a nickel-containing alloy, such as Inconel. In one embodiment, the metal component 210 includes iron or a ferrous alloy, such as Fecralloy.

Metallization, generally, means coating a surface of a substrate (may be non-metallic) with a thin layer of a metal. The thin metal layer need not be continuous. The formation of a metallized ceramic typically includes coating a metal matrix on a portion of a surface of a ceramic, and then sintering the coated ceramic to a high temperature (usually greater than about 1000 degrees Celsius) under a reducing atmosphere in the presence of glass forming constituents that form a glass phase in a resulting metallization layer. In certain embodiments, the metal matrix is sintered in a temperature range from about 1200 degrees Celsius to about 1600 degrees Celsius.

In some instances, the sintering step results in the migration of a glass phase from the interior of the ceramic to the surface of the ceramic, where it fills the pores of the metal matrix while providing a glass bond to the underlying ceramic. In some other instances, as known to those skilled in the art, the glass forming constituent is provided on the surface of the ceramic prior to the sintering step to form the glass phase in the metallization layer. In some instances, the glass forming constituent can be provided in the metal matrix as described in U.S. Pub. No. 2011/0244303, which is incorporated herein by reference.

In one embodiment, the metallization layer 206 may include a refractory metal. In one embodiment, the refractory metal includes one or more of molybdenum, tungsten, niobium, and tantalum. In one embodiment, the metallization layer 206 includes molybdenum. The amount of molybdenum may be higher than about 80 weight percent, based on the total weight of the metallization layer. In certain embodiments, the amount of molybdenum is as high as 100 weight percent. Moreover, the metallization layer 206 may be substantially free of manganese. Particularly, in a sodium metal halide cell, manganese is incompatible in the sodium and/or halide environment of the cell. In certain embodiments, the metallization layer 206 may comprise no manganese, or very small amounts of manganese, for example, at impurity levels.

As discussed above, the metallization layer 206 may further include a glass phase. In some embodiments, the glass phase includes one or more of alpha-alumina, silica, alumina silica, calcia alumina silica, yttria, zirconia, yttria stabilized zirconia, dysprosium oxide, yttrium aluminum garnet, magnesia alumina spinel, or yttrium aluminate perovskite. In one embodiment, the glass phase includes alpha-alumina.

A variety of deposition techniques can be used for metallizing the ceramic component 202. In one embodiment, a metal matrix is first applied in the form of a layer or a coating on the surface 201, followed by sintering. The metal matrix can be applied by any suitable deposition technique known in the art. Non-limiting examples of the deposition techniques include a physical vapor deposition technique, screen printing, painting, and sputtering. The painting technique often includes dipping, spraying, ink printing, syringe or nozzle brushing, or tape transfer. In a particular embodiment, the metal matrix is applied by the screen printing technique. The screen printing technique has high yield and high manufacturing throughput for a large scale manufacturing. In addition, the process is relatively inexpensive and environmentally friendly, compared to other listed processes.

Before deposition, the surface 201 of the ceramic component 202 may be polished or similarly treated, so as to remove any manufacturing damage and/or to improve the surface flatness. For example, the surface 201 may be polished to about 15 microns ANSI/CAMI. The ceramic component 202 may further be chemically cleaned prior to the metallization, so as to remove contaminants that may affect bonding. Furthermore, the ceramic component 202 may be thermally annealed and/or calcined at an elevated temperature prior to the metallization, so as to reduce contamination, reduce residual stresses, and/or heal defects that may have been introduced into the ceramic components during preparation. However, these steps of polishing, cleaning, annealing and calcining may not be essential for producing high-quality joints; and may be used individually or in combination as per requirement.

Usually, a metallization layer may have a large coefficient of thermal expansion (CTE) mismatch with an underlying ceramic. In various embodiments, the metallization layer 206 may have a thickness as small as possible from the stress point of view i.e., the CTE mismatch, yet thick enough to have a sufficient glass phase to provide a high enough bonding strength with the ceramic component 202. In some embodiments, the metallization layer 206 has a thickness in a range of about 5 microns to about 100 microns. In some embodiments, the metallization layer 206 has a thickness in a range of about 10 microns to about 50 microns, and in some specific embodiments, in a range of about 20 microns to about 40 microns.

As mentioned previously, referring to FIGS. 1 and 2, the metallic barrier layer 208 is disposed, for example, plated on a surface 205 of the metallization layer 206. As used herein, a metallic barrier layer refers to a continuous metallic layer. The roles of the metallic barrier layer 208 are to aid wetting of the refractory metallization layer 206 by a metal or an alloy (for example, a braze alloy) that is compatible with the metal component 210 to be joined to the ceramic component 202, and to resist penetration of a bonding material into the metallization layer 206. One key parameter that affects both of these roles is the thickness of the barrier layer 208. If it is too thin, the bonding material (for example a braze alloy) may seep through to the metallization layer 206, but if it is too thick, blisters may be formed during the bonding process that may lead to poor adherence and leaks in a resulting seal/joint. In general, a thickness of the barrier layer 208 from about 1 micron to about 10 microns may be sufficient to avoid such problems. In some embodiments, the thickness of the barrier layer 208 may be between about 2 microns and about 6 microns.

The deposition of the barrier layer 208, if desired, can be carried out by any convenient method, e.g., electroplating, electroless plating, gas phase deposition, sputtering, screen printing etc. In one embodiment, the metallic barrier layer 208 is deposited by screen printing. As alluded to previously, the screen printing technique is highly scalable because of its various advantages, for example, high speed manufacturing, no waste or byproducts, and environmentally benign. In addition, compared to some of the above listed processes, screen printing is a relatively simple, clean and non-aqueous process inside a manufacturing facility for large scale production of the plated ceramic components. In some instances, the deposition of both the metallization layer 206 and the barrier layer 208 can be performed by screen printing, and thus the same manufacturing facility can be used for the deposition of both the layers. Thus some embodiments of the present invention provide a less complex, clean, and cost effective process for ceramic-to-metal joining from the production point of view.

Figure 3:
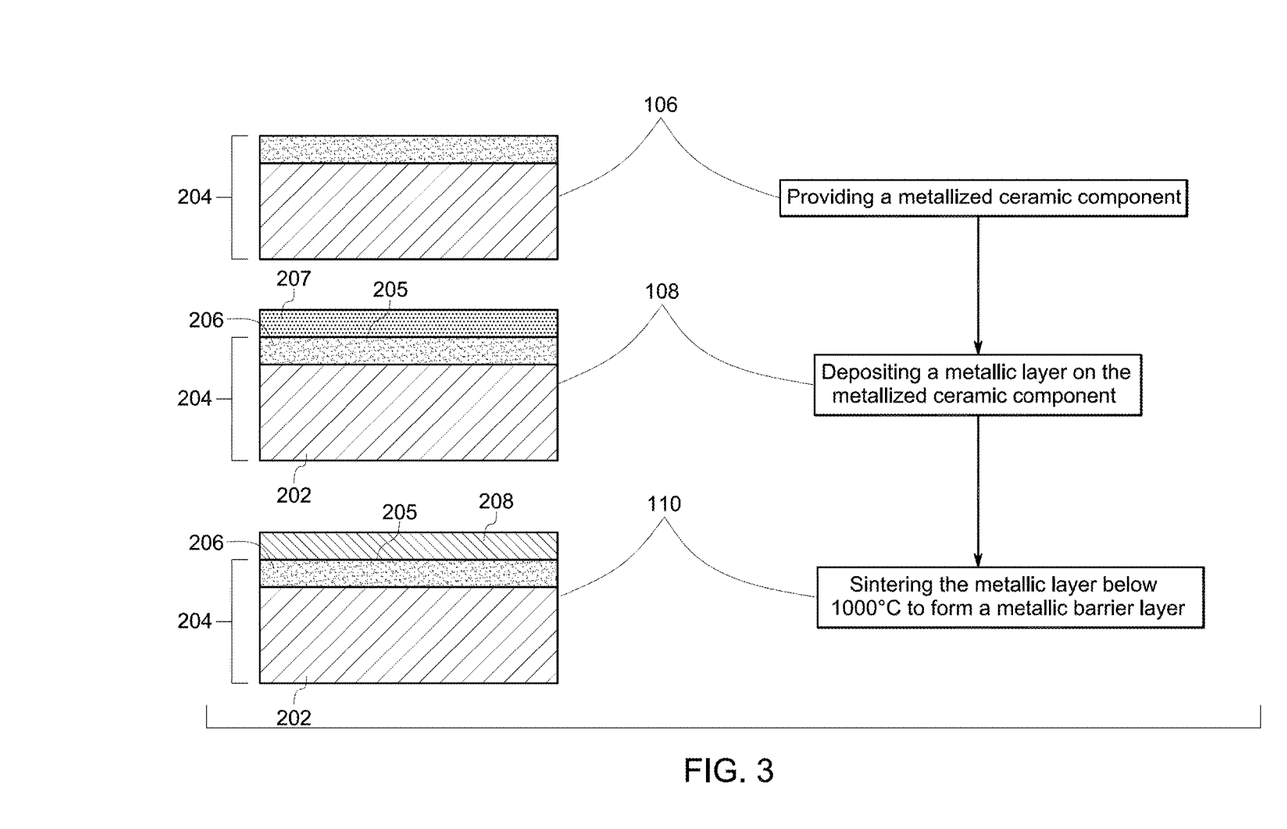
FIG. 3 is a schematic view of a step-wise method for disposing a metallic barrier layer, in accordance with one embodiment of the invention.

In some embodiments, FIG. 3 shows sub-steps of the method step 102 (FIG. 1) for disposing the barrier layer 208 on the metallized ceramic component 204. In a first sub-step 106, the metallized ceramic component 204 is provided. In a second sub-step 108, a metallic layer 207 is deposited on the surface 205 of the metallization layer 206 by a screen printing process. As known to those skilled in the art, a metal layer deposited by screen printing is usually porous. In some instances, the as-deposited metallic layer 207 has a porosity, such as higher than about 25 percent by volume. In some instances, the porosity of the as-deposited metallic layer 207 is even higher, such as higher than about 30 percent, and in some specific embodiments, even higher than about 40 percent. In some embodiments, the porosity of the as-deposited metallic layer 207 is in a range from about 30 percent to about 50 percent (all percentages by volume).

After deposition of the metallic layer 207, the method involves a sintering step 110 to densify the as-deposited porous metallic layer 207. The presence of the melting point depressant in the metallic layer 207 enables sintering of the layer at a much lower temperature (e.g., below about 1000 degrees Celsius) as compared to a sintering temperature of a nickel layer (e.g., above about 1300 degrees Celsius). At low sintering temperatures, the formation of the intermetallic (e.g., Ni—Mo) may not occur, or may be substantially less (less than about 20 volume percent, based on the total volume of the metallization layer). Moreover, the formation of the intermetallic can further be limited by the duration for which the sintering step 110 is performed (i.e., the sintering time).

The densification (or the reduction in the porosity) of the metallic layer 207 may depend on several sintering conditions, for example the sintering temperature, pressure, duration, atmosphere, and multiple sintering steps. In some embodiments, the sintering of the porous metallic layer 207 is carried out at a temperature lower than about 1000 degrees Celsius. In some embodiments, the metallic layer 207 is sintered at an even lower temperature, i.e., lower than about 950 degrees Celsius. In some embodiments, the sintering temperature is in a range from about 700 degrees Celsius to about 950 degrees Celsius, and in some specific embodiments, from about 750 degrees Celsius to about 900 degrees Celsius. In some embodiments, the sintering step 110 is performed for less than about 60 minutes, and in some embodiments, from about 15 minutes to about 30 minutes.

As will be appreciated by one of ordinary skill in the art, the sintering step 110 may include one or more sub-steps, where sintering may be carried out by, for example, using a different temperature, pressure and/or a different environment in one or more of the sub-steps. For example, the sintering step 110 includes a sub-step of heating the metallic layer 207 at about 850 degrees Celsius for about 15 minutes, and then increasing the temperature to about 950 degrees Celsius in next sub-step and then sintering the layer for about 10 minutes.

After sintering, the porosity of the metallic layer 207 may be significantly reduced. The resulting sintered layer is denser than the metallic layer 207 before the sintering step 110, and provides (i.e., is transformed into) the barrier layer 208. In one embodiment, the barrier layer 208 may have lower porosity (higher density) as compared to the high porosity (low density) of the as-deposited metallic layer 207. In one embodiment, the porosity of the barrier layer 208 may be reduced to about 1 percent. In some embodiments, the porosity of the barrier layer 208 may be lower than about 10 percent, and in one specific embodiment, lower than about 5 percent (all percentages by volume).

As discussed above, by optimizing the sintering conditions (temperature and time), a desired densification (i.e., a porosity of about 1 percent by volume) of the metallic barrier layer 208 can be achieved while preventing/minimizing the formation of the undesirable intermetallic materials.

Non-limiting examples of the melting point depressant may include, but are not limited to, aluminum, copper, germanium, silicon, boron, zirconium, or combinations thereof. In one embodiment, the barrier layer 208 may include nickel and copper. In one embodiment, the barrier layer may include nickel and germanium. In certain embodiments, an alloy containing nickel, boron, and silicon (e.g., Ni—B—Si based alloy) may be used with nickel metal for the barrier layer 208.

The amount of the melting point depressant may be sufficient to reduce the melting temperature and thus the sintering temperature of the material, so that the sintering of the metallic layer 207 can be performed at a much lower temperature as compared to the sintering temperature of a nickel layer. In one embodiment, an amount of the melting point depressant in the metallic barrier layer 208 ranges from about 1 weight percent to about 10 weight percent, based on the total weight of the material. In a specific embodiment, the amount of the melting point depressant ranges from about 2 weight percent to about 6 weight percent, based on the total weight of the material.

After formation of the metallic barrier layer 208, a coated ceramic component 212 (FIG. 2) (that includes the metallization layer 206 and the barrier layer 208) can be bonded to the metal component 210. Various bonding methods may be used for the purpose. Suitable bonding methods may include brazing and diffusion bonding. Diffusion bonding typically involves holding the two components under stress at an elevated temperature—usually in a non-oxidizing atmosphere (e.g., hydrogen, nitrogen, argon) or vacuum. The compressive pressure or stress applied should be kept below the pressure levels which may cause macroscopic deformation of the components.

One embodiment provides brazing the metal component 210 to the coated ceramic component 212. Typically, "brazing" uses a braze material (usually an alloy) having a lower liquidus temperature than the melting points of the components (i.e. their materials) to be joined. The braze material is brought slightly above its melting temperature (or liquidus temperature) while protected by a suitable atmosphere. The braze material then flows over the surface (known as wetting) of the components to be joined, and is then cooled to join the components together. As used herein, "braze alloy composition" or "braze alloy", "braze material" or "brazing alloy", refers to a composition that has the ability to wet the components to be joined, and to seal them.

Figure 4:
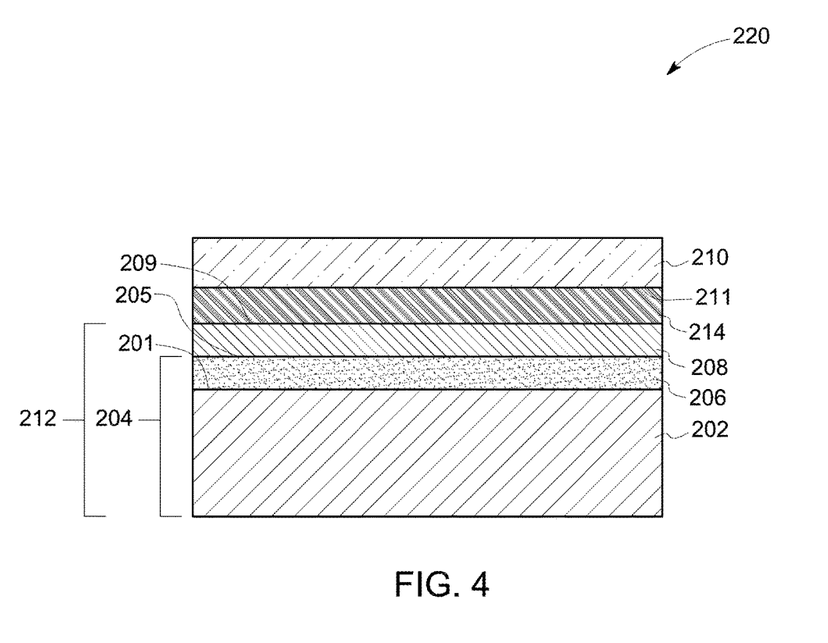
FIG. 4 is a schematic view of a sealing structure, in accordance with another embodiment of the invention.

FIG. 4 shows a sealing structure 220 where the coated ceramic component 212 and the metal component 210 are joined/bonded by brazing, according to one embodiment of the invention. A braze material is introduced between a surface 209 of the metallic barrier layer 208 and a surface 211 of the metal component 210. In one embodiment, a layer 214 of the braze material is disposed on at least the surface 211 or the surface 209 to be joined by brazing. The layer 214 of the braze material, in a specific embodiment, is disposed on the surface 209 of the barrier layer 208. The thickness of the braze material layer 214 may be in a range between about 5 microns to about 100 microns. In some specific embodiments, the thickness of the layer 214 ranges from about 10 microns to about 50 microns. The layer 214 may be deposited or applied on one or both the surfaces to be joined, by any suitable technique, e.g. by a printing process or other dispensing processes. In some instances, a foil, a wire, or a preform may be suitably positioned for bonding the surfaces to be joined.

A braze material, for a particular application, should withstand the service conditions required, and should melt at a lower temperature than the base materials; or should melt at a very specific temperature. In one embodiment, the braze material includes a nickel-based alloy or a cobalt-based alloy. In general, the amount of nickel or cobalt balances the respective alloy based on the amounts of the other constituents. These braze alloy may further include at least one of chromium, cobalt, iron, nickel, aluminum, gold, tin, zinc, molybdenum, germanium, silicon, boron, or a combination thereof. These constituents may provide adjustments in several required properties of the braze alloy, for example, the coefficient of thermal expansion, the liquidus temperature, the brazing temperature, the corrosion resistance, and the mechanical strength of the braze alloy. With respect to the amount, the braze alloy includes up to about 30 weight percent (e.g., about 0.1%-30%) of each of the constituents, based on the total weight of the braze alloy. Some non-limiting examples of the braze alloy are Ni-7Cr-3Fe-4.5Si-3.5B, Co-7Cr-3Fe-4.5Si-3.5B, 92.5Ni-4.5Si-3B, 71Ni-19Cr-10Si, 36Ni-34Pd-30Au, and 47Ni-47Pd-6Si.

As discussed previously, the braze alloy has a liquidus temperature lower than the melting temperatures of the components to be joined. In one embodiment, the braze alloy has a liquidus temperature of at least about 850 degrees Celsius. In one embodiment, the braze alloy has a liquidus temperature from about 850 degrees Celsius to about 1300 degrees Celsius, and in some specific embodiments, from about 950 degrees Celsius to about 1250 degrees Celsius.

For brazing, the braze alloy is heated to a brazing temperature at which the braze alloy melts and flows over the surfaces. The brazing temperature is usually higher than the liquidus temperature of the braze alloy. The heating can be undertaken in a controlled atmosphere, such as argon, hydrogen, nitrogen, helium; or in a vacuum. To achieve good flow and wetting of the braze alloy, the alloy is held at the brazing temperature for a few minutes after melting of the alloy.

In one embodiment, the brazing may be carried out at a brazing temperature ranging from about 900 degrees Celsius to about 1200 degrees Celsius for about 1 minute to about 15 minutes. In a specific embodiment, the brazing may be carried out from about 1000 degrees Celsius to about 1100 degrees Celsius for about 5 minutes to about 15 minutes.

Although the brazing temperature may be high enough, in some embodiments, to initiate the formation of the intermetallic (e.g., Ni—Mo), the duration of the brazing process (which includes holding the sealing structure at the brazing temperature) should be brief enough to prevent the formation of a significant amount of the intermetallic. A small amount of the intermetallic (e.g., less than about 20 volume percent) may be formed during any heating step of the sealing process, which may have an insignificant effect on the strength of the seal/joint.

Figure 5:
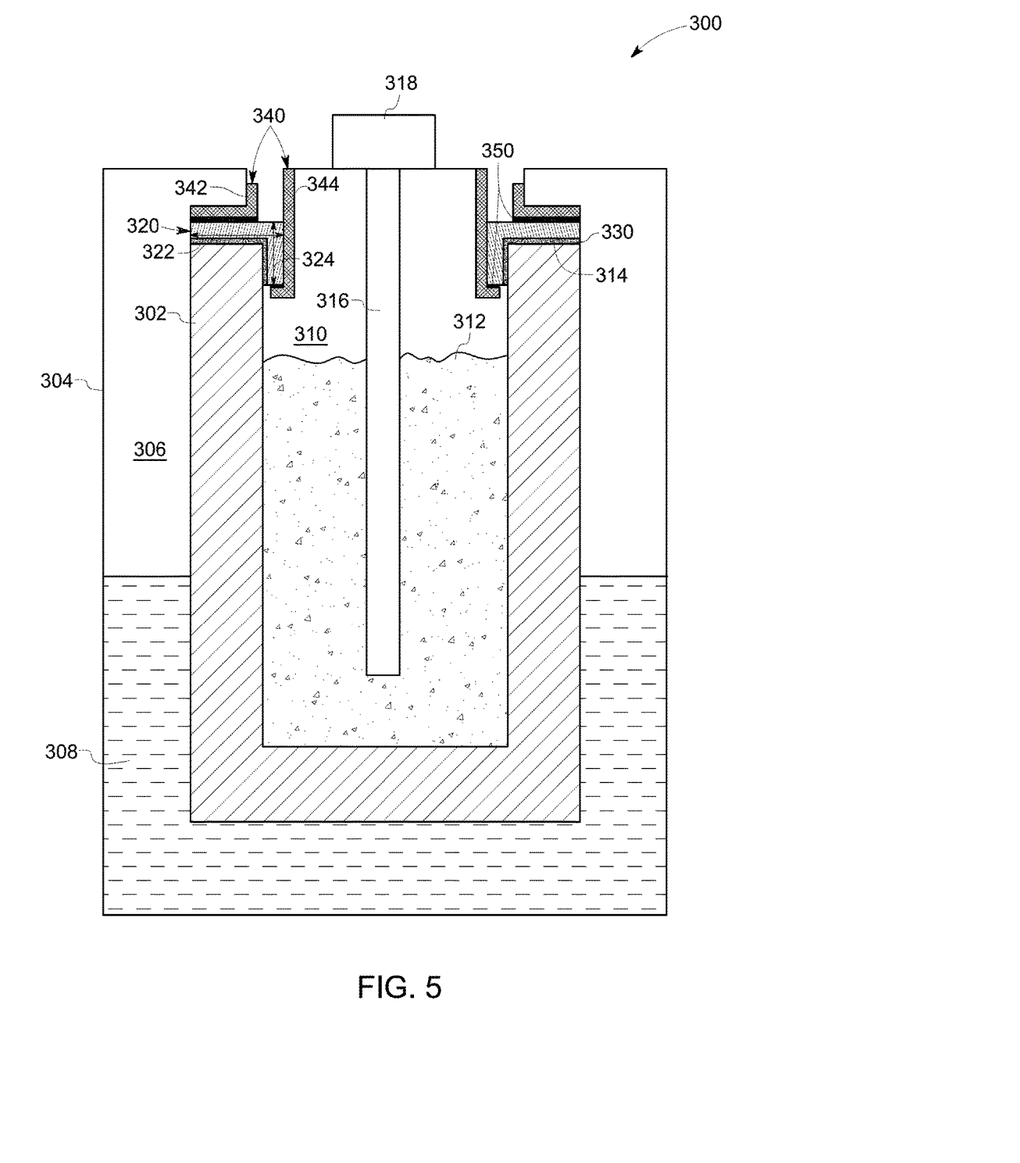
FIG. 5 is a schematic view showing a cross-section of an electrochemical cell using a sealing structure, in accordance with one embodiment of the invention.

FIG. 5 is a schematic diagram depicting an exemplary embodiment of a sodium-metal halide battery cell 300 that includes a ceramic-to-metal sealing structure as described above. The cell 300 has an ion-conductive separator tube 302 disposed in a cell case 304. The separator tube 302 is usually made of β-alumina or β"-alumina. The tube 302 defines an anode chamber 306 between the cell case 304 and the tube 302, and a cathode chamber 310, inside the tube 302. The anode chamber 306 usually contains an anode material 308, e.g. sodium. The cathode chamber 310 contains a cathode material 312 (e.g. nickel and sodium chloride), and a molten electrolyte, usually sodium chloroaluminate ($NaAlCl_4$).

An electrically insulating ceramic collar 320, which may be made of alpha-alumina, is situated at a top end 314 of the tube 302. A cathode current collector assembly 316 is disposed in the cathode chamber 310, with a cap structure 318 in the top region of the cell. The ceramic collar 320 is fitted onto the top end 314 of the separator tube 302, and is sealed by a glass seal 330. In one embodiment, the collar 320 includes an upper portion 322, and a lower inner portion 324 that abuts against an inner wall of the tube 302, as illustrated in FIG. 5.

In order to seal the cell 300 at the top end (i.e., its upper region), and protect the alumina collar 320 in the corrosive environment, a metal ring 340 is disposed, covering the alpha alumina collar 320, and joining the collar with the current collector assembly 316, at the cap structure 318. The metal ring 340 has two portions; an outer metal ring 342 and an inner metal ring 344, which are joined, respectively, with the upper portion 322 and the lower portion 324 of the ceramic collar 320, through a seal 350. The seal 350 is provided by the method of ceramic-to metal joining as described above, and includes a sealing structure (for example, similar to the sealing structure 220 of FIG. 4). The seal 350 maintains a seal between selected contents of the cell and the environment at the operating temperature of the cell. The cell is often operable at a temperature greater than about 100 degrees Celsius. In some embodiments, the operation temperature of the cell ranges from about 300 degrees Celsius to about 500 degrees Celsius. The collar 320 and the metal ring 340 may be temporarily held together with an assembly (e.g., a clamp), or by other techniques, until the sealing process is complete.

The outer metal ring 342 and the inner metal ring 344 are usually welded shut to seal the cell, after joining with the ceramic collar 320 is completed. The outer metal ring 342 can be welded to the cell case 304; and the inner metal ring 344 can be welded to the current collector assembly 316.

The shapes and size of the several components discussed above with reference to FIG. 5 are only illustrative for the understanding of the cell structure; and are not meant to limit the scope of the invention. The exact position of the seals and the joined components can vary to some degree. Moreover, each of the terms "collar" and "ring" is meant to comprise metal or ceramic parts of circular or polygonal shape, and in general, all shapes that are compatible with a particular cell design.

EXAMPLES

The example that follows is merely illustrative, and should not be construed to be any sort of limitation on the scope of the claimed invention. Unless specified otherwise, all ingredients may be commercially available from such common chemical suppliers as Alpha Aesar, Inc. (Ward Hill, Mass.), Sigma Aldrich (St. Louis, Mo.), Spectrum Chemical Mfg. Corp. (Gardena, Calif.), and the like.

Example 1

2 samples (sample 1 and sample 2) of alpha alumina collars having molybdenum metallization were taken for analysis. The alumina collar has a circular ridge with an outer diameter of 28 mm and a surface area of 150 $mm^2$.

Samples 1 and 2 were respectively plated with nickel and nickel-2% copper by a screen printing technique. Nickel screen printing ink having bimodal particle size distribution was obtained from Heraeus. For sample 2, 2 weight percent copper was added to the ink. The deposition was performed using 325 mesh screen by a DEK Horizon screen printer. Each of the plating layers had a thickness of about 15 microns, and a porosity of about 40 percent by volume. After deposition, these samples were sintered at about 850 degrees Celsius for about 15 minutes in an atmosphere of 4 percent hydrogen and balance nitrogen. After sintering, the porosity of the Ni-2% Cu plating layer (sample 2) was less than about 5 percent by volume; and the porosity of Ni plating layer (sample 1) was about 15 percent.

Each plated sample 1 and 2 was then bonded to a nickel seal ring that matched the size of the ridge on the alumina collar, by brazing. A foil of a braze composition Ni-7Cr-4.5Si-3Fe-3.5B was placed between the plated layer and the nickel ring, and heated up to a temperature of about 1055 degrees Celsius. Each sample was hold at about 1055 degrees Celsius for about 15 minutes, in an atmosphere of 4 percent hydrogen and balance nitrogen, to perform brazing.

Figure 6:
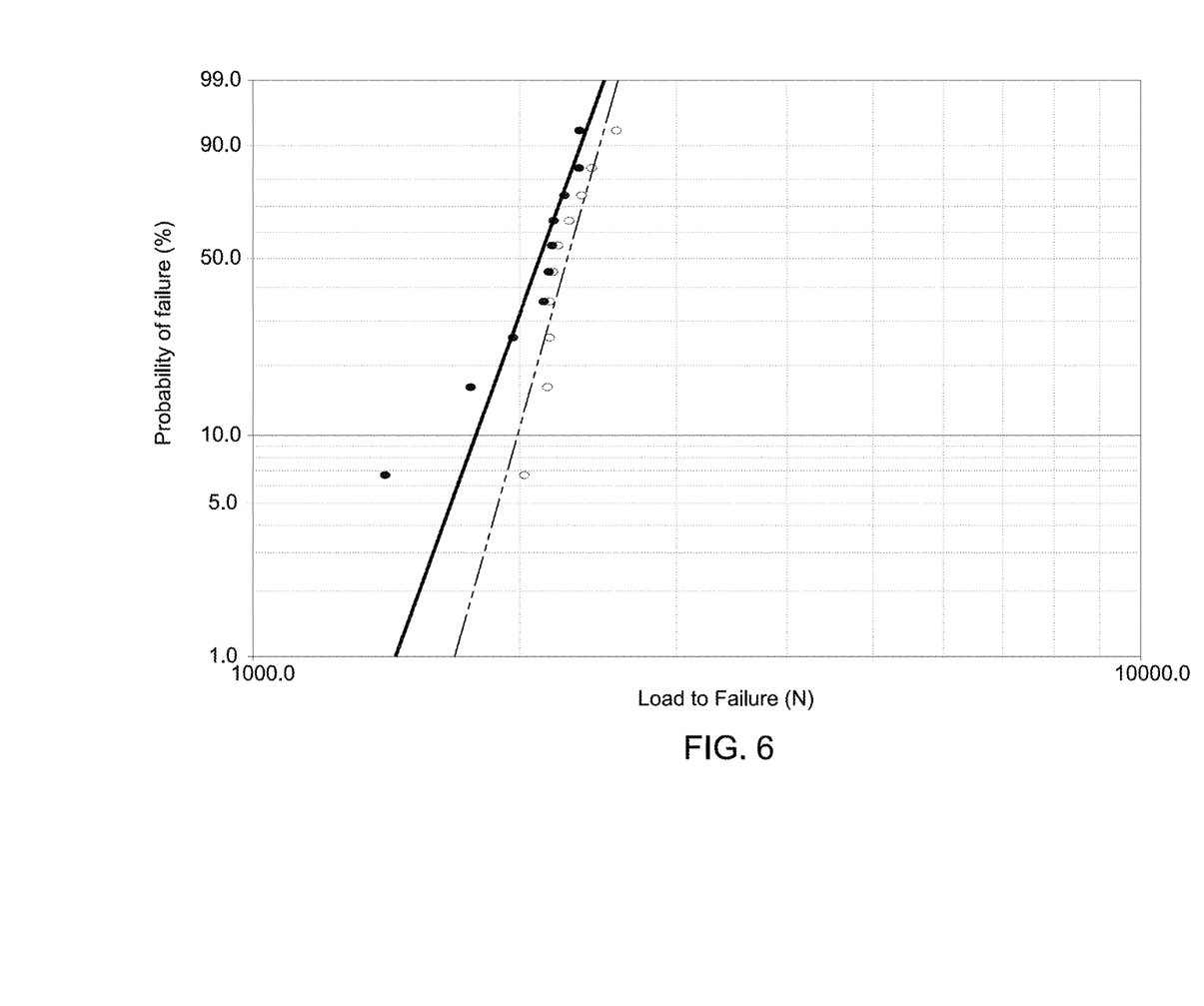
FIG. 6 is a graph showing comparative results of a peel test for two bonded structures.

The resulting bonded structures 1 and 2, corresponding to samples 1 and 2 respectively, were then subjected to a leak test and subsequently to a peel test. All the parts were found to be hermetic when tested with helium leak rate. A helium leak of less than $4 \times 10^{-9}$ millibar.liter/sec was considered as pass. The peel test measures the load required to push apart the nickel seal ring from the bonded surface and is a measure of joint strength. The alumina section of the bonded structures was held in a place, and the nickel section was pushed by a push rod. FIG. 6 shows a joint strength plotted with a 2-parameter Weibull, where the y-axis is probability of failure (%) and the x-axis is load-to-failure (N). The solid line corresponds to the joint of the structure 2; and the dotted line corresponds to the joint of the structure 1. It is clear from the plot that while, in this instance, the joint of structure 2 (solid line) did not exceed much that of the structure 1 (dotted line), in terms of strength, it was generally as good as the joint of structure 1. It may also be possible to increase the strength of the joint by various adjustments, e.g., by optimizing the content of copper and the particle size distribution in the Ni—Cu material, or by adjusting the plating thickness and the sintering conditions for achieving a dense nickel-containing plating layer to be bonded to the nickel ring. Thus, the present inventors discovered that a satisfactory joint with approximately the same strength of a joint formed by a conventional process can be obtained by using the screen printing process for depositing a Ni-containing plating layer.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method, comprising:
   disposing, by a screen printing process, a metallic barrier layer on a metallized portion of a ceramic component, wherein the metallic barrier layer has a porosity higher than about 25 percent by volume and comprises nickel and a melting point depressant; and
   joining a metal component to the metallized portion of the ceramic component through the metallic barrier layer.

2. The method of claim 1, wherein the ceramic component comprises alpha alumina and the metal component comprises nickel or an alloy thereof.

3. The method of claim 1, wherein the metallized portion of the ceramic component comprises a metallization layer comprising titanium, tantalum, vanadium, tungsten, molybdenum or combinations thereof.

4. The method of claim 1, wherein the melting point depressant comprises copper, silicon, germanium, boron, aluminum, zirconium, or combinations thereof.

5. The method of claim 1, wherein an amount of the melting point depressant in the metallic barrier layer ranges from about 1 weight percent to about 10 weight percent.

6. The method of claim 1, wherein disposing the metallic barrier layer further comprises sintering the metallic layer at a temperature less than about 1000 degrees Celsius to form the metallic barrier layer.

7. The method of claim 6, wherein sintering is carried out in a temperature range from about 700 degrees Celsius to about 950 degrees Celsius.

8. A method for sealing a high temperature thermal electrochemical cell, comprising:
   disposing a metallization layer comprising molybdenum on a portion of an alumina component;
   disposing a metallic layer comprising nickel and a melting point depressant on the metallization layer by a screen printing process;
   sintering the metallic layer at a temperature less than about 1000 degrees Celsius to form a metallic barrier layer, wherein the metallic barrier layer has a porosity higher than about 25 percent by volume and comprises nickel and a melting point depressant; and
   joining the portion of the alumina component to a nickel-containing metal component by brazing through the metallization layer and the metallic barrier layer.

9. A sealing structure, comprising:
   a metallized ceramic component;
   a metallic barrier layer disposed on the metallized ceramic component by a screen printing process and subsequently sintered at less than about 1000 degrees Celsius, wherein the metallic barrier layer comprises nickel and a melting point depressant;
   a metal component bonded to the metallized ceramic component through the metallic barrier layer; and
   a braze material disposed between the metallic barrier layer disposed on the metallized ceramic component and a surface of the metal component.

10. The sealing structure of claim 9, wherein the ceramic component comprises alpha alumina and the metal component comprises nickel or an alloy thereof.

11. The sealing structure of claim 9, wherein the metallized ceramic component comprises a metallization layer comprising titanium, tantalum, vanadium, tungsten, molybdenum or combinations thereof disposed on a portion of the ceramic component.

12. The sealing structure of claim 9, wherein the melting point depressant comprises copper, silicon, germanium, boron, aluminum, zirconium, or a combination thereof.

13. The sealing structure of claim 9, wherein an amount of melting point depressant in the metallic barrier layer ranges from about 1 weight percent to about 10 weight percent.

14. The sealing structure of claim 9, wherein the metallic barrier layer has a thickness in a range from about 1 micron to about 10 microns.

15. A high temperature thermal electrochemical cell comprising a sealing structure of claim 9.

* * * * *